US005910523A

United States Patent [19]

Hudson

[11] Patent Number: 5,910,523

[45] Date of Patent: Jun. 8, 1999

[54] POLYOLEFIN NANOCOMPOSITES

[76] Inventor: Steven David Hudson, 3372 E. Fairfax Rd., Cleveland Heights, Ohio 44118

[21] Appl. No.: 08/980,738

[22] Filed: Dec. 1, 1997

[51] Int. Cl.[6] .......... C08K 9/06

[52] U.S. Cl. .......... 523/213; 523/216; 524/262; 524/445; 524/492; 524/504; 524/528; 525/285; 525/301

[58] Field of Search .......... 524/262, 445, 524/492, 528, 504; 525/285, 301; 523/213, 216

[56] References Cited

U.S. PATENT DOCUMENTS

| | | | |
|---|---|---|---|
| 4,705,818 | 11/1987 | Kawai et al. | 524/444 |
| 4,868,226 | 9/1989 | Mitsuno et al. | 523/213 |
| 5,256,720 | 10/1993 | Kuwata et al. | 524/492 |
| 5,514,734 | 5/1996 | Maxfield et al. . | |
| 5,578,672 | 11/1996 | Beall et al. | 523/216 |
| 5,637,629 | 6/1997 | Moro et al. | 524/444 |

*Primary Examiner*—Andrew E. C. Merriam
*Attorney, Agent, or Firm*—Hudak & Shunk Co., L.P.A.

[57] ABSTRACT

Composites from a semi-crystalline polyolefin and nanometer sized fillers with improved modulus, tensile strength and crack growth resistance are disclosed. The nanometer sized fillers are first functionalized with an aminosilane. Thereafter, a carboxylated or maleated polyolefin is grafted to the filler through an amine-carboxyl reaction. The resulting modified filler is dispersed in a semi-crystalline polyolefin (eg. polyethylene or polypropylene). Co-crystallization between the carboxylated or maleated polyolefin and the semi-crystalline polyolefin can improve interaction between the filler and semi-crystalline polyolefin.

13 Claims, 4 Drawing Sheets

POLYOLEFIN NANOCOMPOSITES

FIELD OF INVENTION

This invention relates to composites from at least one filler having at least one dimension (length, width, thickness) in the range from about 1 to about 30 nanometers which has been modified with an aminosilane and a carboxylated or maleated polyolefin. The filler surface is first partially or fully amine functionalized. When the carboxyl or maleate groups of the polyolefin react with the partially or fully amine functionalized surface, the surface of the filler is partially or fully covered with the polyolefin. The partially or fully polyolefin functionalized surface of the filler can be mixed into a semi-crystalline polyolefin to increase the ultimate tensile strength, increase the modulus, and improve the crack growth resistance. The carboxylated or maleated polyolefin can desirably co-crystallize with the semi-crystalline polyolefin.

BACKGROUND OF THE INVENTION

Fillers have been modified with silanes to improve their compatibility with a matrix material or allow some chemical bonds to form between the filler and a matrix material.

SUMMARY OF INVENTION

Fillers having at least one dimension (length, width or thickness) in the about 1 to about 30 nanometer size range which are reactive with silanols of a silane can be functionalized with aminosilanes to form a partially or fully aminosilane functionalized filler. The aminosilane functionalized filler can be reacted with carboxyl groups from a carboxylated or maleated polyolefin to form a partially or fully polyolefin functionalized filler. Such partially or fully polyolefin functionalized fillers can be added to semi-crystalline polyolefins such as polyethylene or polypropylene to improve their tensile strength, modulus, and crack growth resistance. Preferred fillers include clays and silicas.

BRIEF DESCRIPTION OF FIGURES

In FIG. 4, the silane content is 2 wt. % based on the weight of the clay, the clay content is 10 wt. % and the maleated polypropylene is 90 wt. % based on the modified clay, and the modified clay is 1 or 3 wt. % based on the filler reinforced isotactic polypropylene. The actual data for FIGS. 1, 2, and 3 are in Tables I through IV.

DETAILED DESCRIPTION

Figure 1:
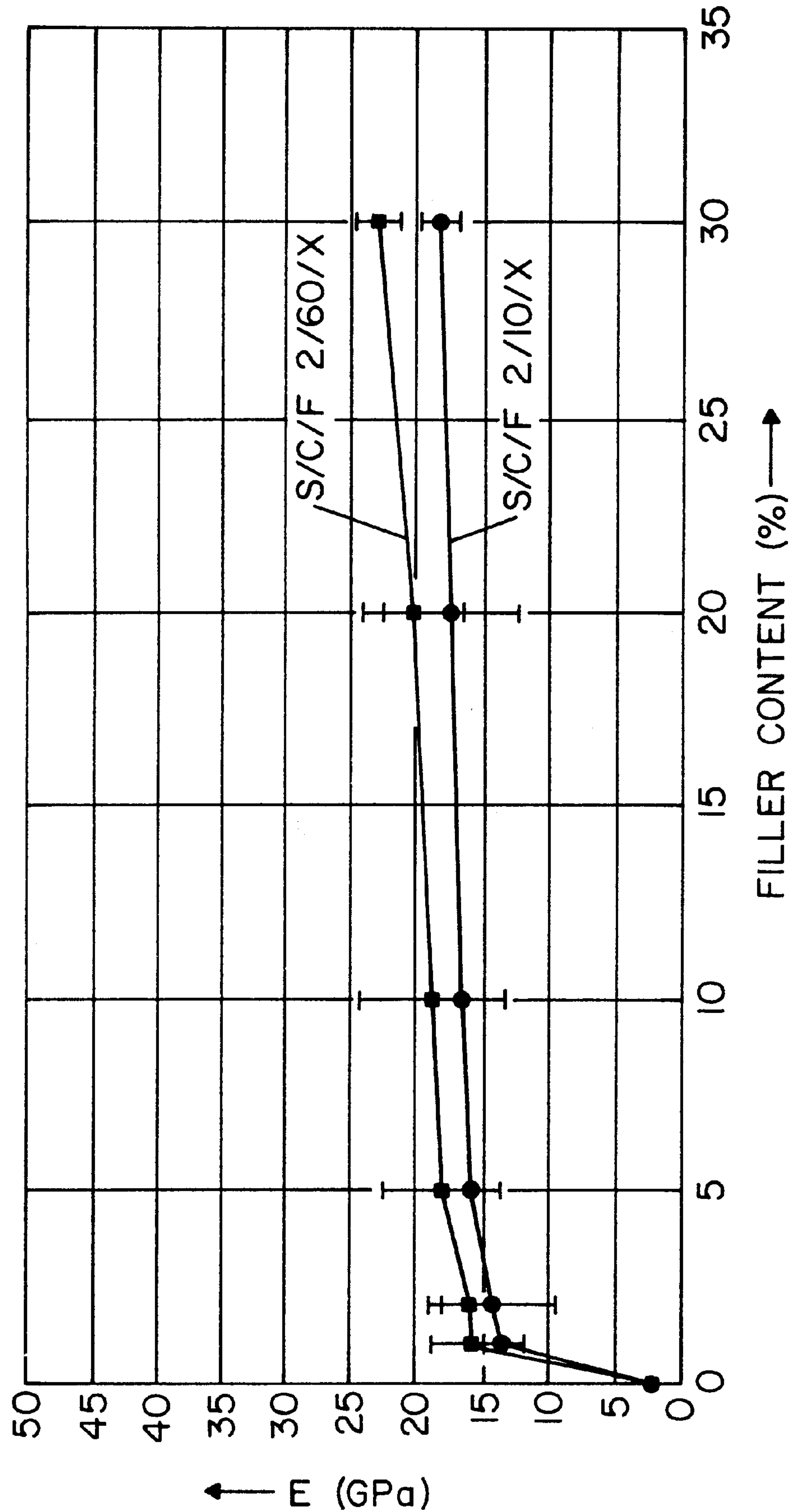
FIG. 1 illustrates the tensile modulus of a variety of partially or fully polypropylene functionalized fillers dispersed in an isostatic polypropylene.

The nanosize fillers can be generally any filler or combination of fillers having at least one dimension (length, width, or thickness) from about 1 to about 30 nanometers. For the purpose of this disclosure the dimension is that of the filler dispersed in a continuous matrix, for example clays which can be broken down into very thin constituent layers (platelets) when dispersed in a molten polyolefin under shear. The clay layers will be described as platelets for lack of a more specific name.

Nanosize fillers can include clays, both as found naturally and modified by subsequent chemical reactions; precipitated, fumed, or aerogel silicas including those having at least 50 wt. % $SiO_2$; and mined mineral products high in $SiO_2$ content (e.g. at least 25, 50, or 75 wt. % $SiO_2$) such as diatomaceous earth, mica, wollastonite etc. The amount of nanosize fillers in a filler reinforced polyolefin is desirably from about 0.1 or 1 to about 45 or 50 parts, more desirably from about 0.2 or 2 to about 20 parts, and preferably from about 0.3 or 3 to about 10 parts by weight per 100 parts by weight of the filler reinforced polyolefin.

Aminosilanes are used to partially or fully functionalize the surface of the nanosize filler. Partially will be used to refer to at least one or more group on the surface of filler. Fully will refer to a population of the functional group on the surface such that it is difficult to add additional groups. With respect to a partially functionalized filler, it is not necessary that all sides or surfaces of a filler be functionalized. Desirable aminosilanes include those of the formula

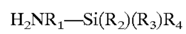

$$H_2NR_1\text{—}Si(R_2)(R_3)R_4$$

wherein $R_1$ is a connecting group between the amine and the Si atom desirably having a molecular weight from about 20 or 50 to about 200 or 300 g/mole. Desirably $R_1$ is an alkylene group or an aromatic group or combinations thereof having a molecular weight in the range provided. Desirably $R_1$ is an alkylene of from 3 to 12 carbon atoms such as butylene, hexylene, or dodecylene. Desirably $R_2$ and $R_3$ independently are a hydroxyl, a halogen, an alkyl, alkoxy, phenoxy, or aromatic group or combinations thereof having from 1 to 12 carbon atoms. Optionally $R_2$ or $R_3$ can be a group which can hydrolyze to form an hydroxyl group. Desirably $R_4$ is a halogen, an alkoxy or phenoxy having from 1 to 12 carbon atoms. Optionally the silane can be one of the given formula reacted with a multifunctional silane such as a di or tri alkoxy silane such as an alkyl amino triethoxy silane or an analogous trimethoxy silane where the alkoxy group has from about 1 to about 8 carbon atoms. Multifunctional aminosilanes possibly promote bonding to a filler surface.

The amount of aminosilane is desirably from about $3\times10^{-6}$ to about $10^{-3}$ grams, more desirably from about $10^{-5}$ to about $10^{-4}$ grams per square meter of filler surface area. Desirably the amount of aminosilane is from about 0.002 to about 0.20 grams, more desirably from about 0.005 to about 0.05, and preferably from about 0.01 to about 0.03 grams per gram of filler. Desirably the amount of aminosilane is from about 0.001 to about 3 wt. %, more desirably from about 0.002 to about 2 wt. %, and preferably from about 0.005 to about 1.5 or 2 wt. % of the filler reinforced polyolefin composite.

The principal polymer of the filler reinforced composite is desirably a semi-crystalline polyolefin. The polyolefin desirably has at least 5, 10, or 15 weight percent crystalline polymer with the remainder being amorphous. The polyolefin desirably is a homopolymer of one olefin, a copolymer of two or more olefins, or a copolymer having at least 75 weight percent repeat units from olefin monomers having from 2 to 12 carbon atoms, more desirably from about 2 or 3 to about 8 carbon atoms. The remainder of the copolymer may be derived from polymerizing any monomer copolymerizable with the monoolefins. Desirably the semi-crystalline principal polymer is from about 50 to about 99 weight percent, more desirably from about 60 to about 99 weight percent, and preferably from about 70 or 75 to about 98 weight percent of the filler reinforced composite.

The term principal polymer is used because small amounts of polymeric additives can be present to impart impact strength, ease processability etc. Desirably the principal polymer is at least 70, 80, or 90 wt. % of the polymer (excluding the carboxylated or maleated polyolefin) of the filler reinforced composite.

A carboxylated or maleated polyolefin is reacted with the partially or fully aminosilane functionalized filler. The carboxyl or maleate groups are generally known to covalently bond to amine groups. The carboxylated or maleated polyolefin can be a homopolymer, a copolymer from two or more monoolefins, or a copolymer of one or more monoolefins and one or more monomers copolymerizable with said one or more monoolefins. If the copolymer includes repeat units from monomers other than olefins, then desirably the repeat units from the monoolefins are at least 75 wt. % of the polyolefin. Desirably at least 5, 10, or 15 wt. % of the carboxylated or maleated polyolefin is crystalline (e.g. crystallinity is at least 5, 10, or 15 wt. %). Desirably the crystalline portion of the carboxylated or maleated polyolefin can co-crystallize with the crystalline portion of the principal polymer of the filler reinforced composite. Thus, if the principal polymer is crystalline polyethylene, then the carboxylated or maleated polyolefin has a portion of crystalline polyethylene. Similarly, a semi-crystalline polypropylene principal polymer and a semi-crystalline carboxylated or maleated polypropylene could co-crystallize. Alternatively to the terminology carboxylated or maleated polyolefin for this polymer one could describe it as a polyolefin with pendant carboxylic acid groups or anhydrides of carboxylic acid groups. The polyolefin with said pendant group would desirably have from about 0.01 to about 10, more desirably from about 0.05 to about 1 mole percent repeat units with either a pendant carboxylic acid group or a pendant anhydride of carboxylic acid groups. Pendant refers to being covalently bonded to the polyolefin and can include terminal attachment and/or attachment along the polyolefin chain.

The carboxylated or maleated polyolefin is desirably present in an amount from about 0.05 to about 9.5 grams per gram of said filler, more desirably from about 0.1 to about 9 grams, and preferably from about 0.2 to about 5 grams per gram of said filler. When an aminosilane modified clay was functionalized with polyolefin as in the examples, the physical separation between the clay layers was increased due to the entry of maleated polypropylene. Desirably the carboxylated or maleated polyolefin is present from about 0.1 to about 30 weight percent, more desirably from about 0.2 to about 25 weight percent, and preferably from about 0.3 to about 20 weight percent of the filler reinforced polyolefin composite.

The aminosilane can be added to the filler by any method which exposes the filler surfaces to the aminosilane for a sufficient period of time to allow them to react. The reaction between two silanol groups yields a Si—O—Si bond. Alkoxy groups on the silane can be converted to silanol groups by acid or base catalysis consuming a molecule of $H_2O$ and generating an alkanol. The aminosilane can be added as a gas, liquid, or dissolved or dispersed in gas or liquid. The reaction can occur at room temperature or below, or at elevated temperatures. The reaction time can vary from a few seconds to hours or days depending on temperatures and catalysts present.

The reaction of the maleated or carboxylated polyolefin with the partially or fully aminosilane functionalized filler can be run under a variety of conditions. A bulk reaction between the polyolefin in a melt form and the filler would be preferred for cost reasons. A solvent (xylene) was used to dissolve the maleated polypropylene in the examples and then the filler was added at about 120° C. This facilitated complete exposure of the aminosilane functionalized surface to the maleated polypropylene. The reaction between the amine and the carboxyl groups is faster at higher temperatures and is driven by the removal of a molecule of water (a byproduct). Reaction times can vary depending upon the extent of reaction desired between the carboxyl groups and the amine groups.

A particular benefit anticipated from these nanoparticle composites is the generation of more tie chains between the crystals of the semi-crystalline polyolefins. Tie chains are segments of the polyolefins that interconnect the crystals. The tie chains connect the crystals by crystallizing part of themselves in multiple crystals. When a stress or deformation is applied to the semi-crystalline polymer, the tie chains would be anticipated to increase modulus and tensile strength. As crack growth requires breaking the tie chains between crystalline areas on both sides of a crack, an increase in the relative amount of tie chains would slow crack growth.

EXAMPLES

The coupling reaction of montmorillonite clay and silane (in various ratios) was carried out and analyzed by $^{13}C$ NMR. The general procedure was to blend the clay and the aminosilane in either ethanol and water, or dimethyl acetamide and thereafter react them for 2 to 4 hours at 25 to 90° C. The silane was amino ethyl-dimethyl ethoxysilane. The monoalkoxy silane may react to either transesterify with the clay surface or self-condense to form dimer, or it may remain unreacted. Grafting may lead to precipitation. It is difficult to detect the grafted product, the other reaction products can be analyzed. The reaction produces ethanol, which has been detected in the distillate (resonances at 19 and 57.5 ppm in C NMR), confirming the reaction, while at the same time no dimer was detected. Detection of the dimer is facile (resonances at 9.3 and 13.9 ppm), and under different conditions we could have formed the dimer, and fully characterized it. X-ray diffraction of the silane treated montmorilonite demonstrated an increase in interlayer separation.

After silane coupling to the clay filler, the maleated polyolefin coupling to the clay filler surface (grafting) was carried out easily in a dilute maleated polypropylene solution (1–5 wt. % maleated polypropylene in xylene) at about 120° C. for 30 minutes. The silane modified clay surface has an amine functional group which couples with anhydride modified polyolefins to form an amide or imide linkage. Amidization of model compounds has been confirmed by NMR spectroscopy. The relative amounts of clay, aminosilane, and maleated polypropylene used were as shown in Tables I and II. The maleated polypropylene had a number average molecular weight of about 20,000 and about 1 wt. % groups from maleic anhydride. In the maleation reaction the maleate is generally converted to succinate.

Figure 2:
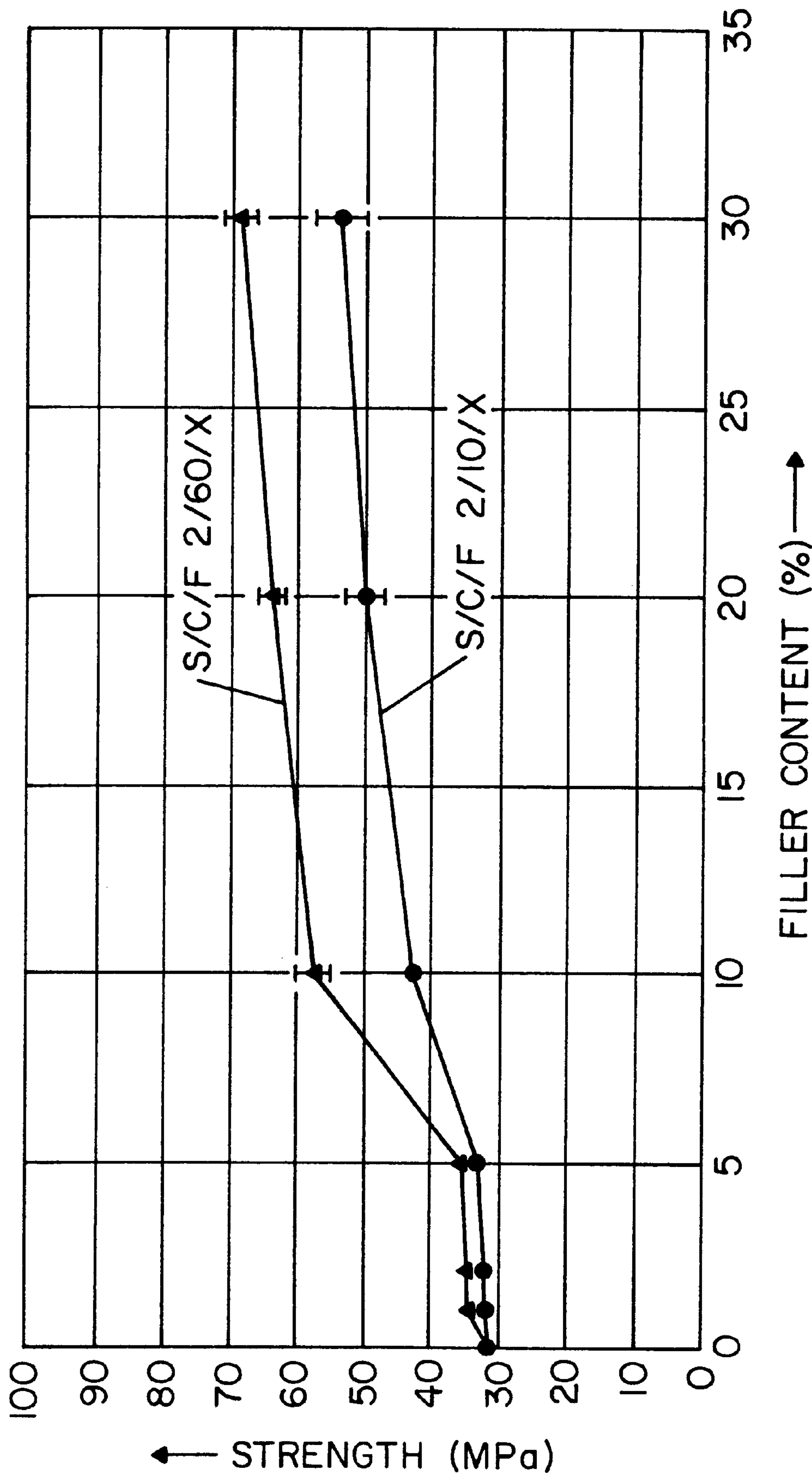
FIG. 2 illustrates the tensile strength.
Figure 3:
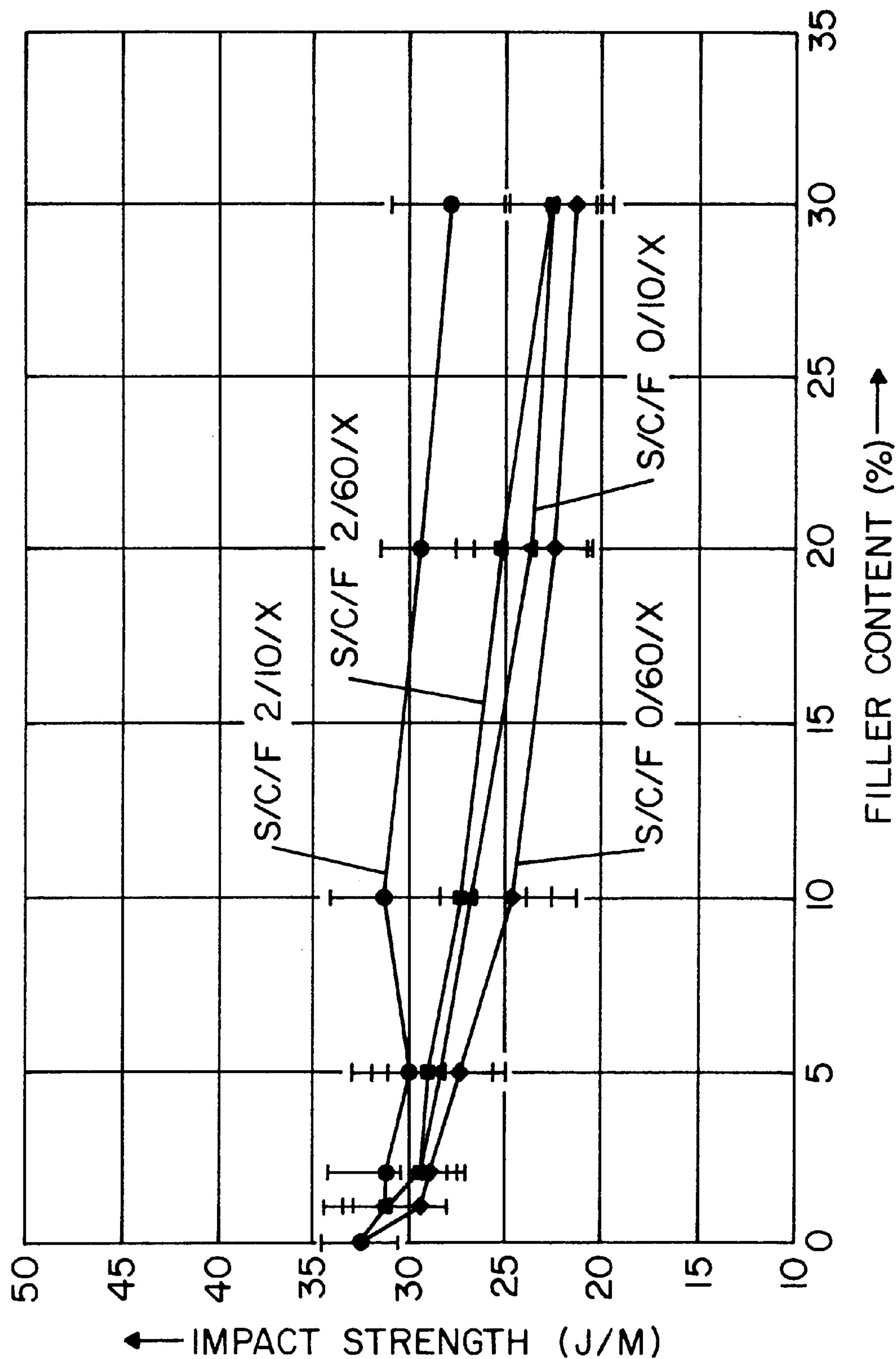
FIG. 3 illustrates the Izod Impact and FIG. 4 illustrates the crack length as a function of time for a specimen exposed to a moderate amount of stress.
Figure 4:
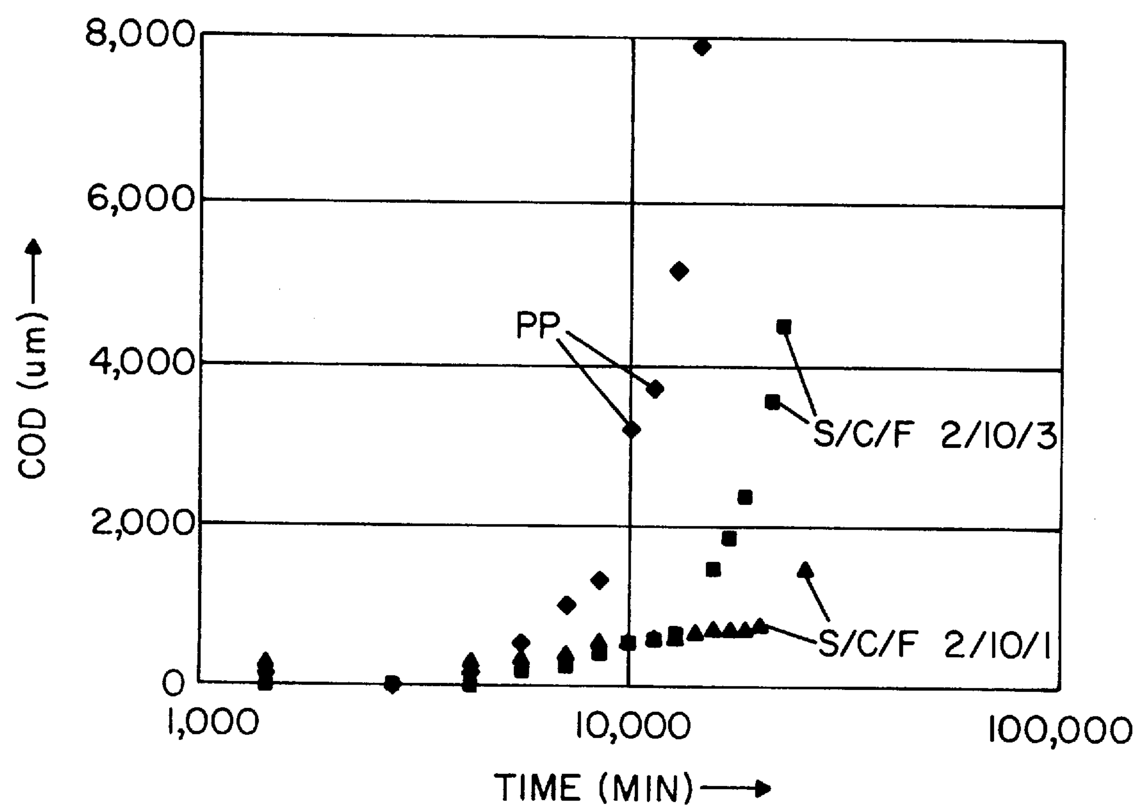

The morphology of different nanofillers was studied by x-ray diffraction. When the relative amount of silane and grafted polymer was small, e.g. 1 and 5% wt., respectively, two populations of swollen clay layers were detected: one characteristic of silane alone, and another at approximately 24 Å, corresponding to polymer swollen layers. When the amount of grafted polymer was increased, e.g. to 25% wt., all layers were swollen with polymer, and a single interlayer spacing was observed. When the amount of grafted polymer exceeded 50% wt., some polymer chains were able to crystallize, forming small (73 Å) isotactic polypropylene crystals. The coverage of the polymer chains may be non-uniform: a few chains being intercalated within the thin stacks (interlayer spacing ~24 Å), and more chains being grafted on the external surfaces and edges of such stacks. These latter chains were able to crystallize. When these polypropylene chain-grafted particles were dispersed in isotactic polypropylene, although many individual layers were found by TEM analysis of ultramicrotomed sections of composites containing 15% clay, most were found in stacks of 2–4 layers that extend~1 micrometer in length Mechanical properties of these composites are very encouraging and surprising. The tensile modulus increases nearly 8-fold to 16 GPa with just 1% loading (FIG. 1). At higher loading, the modulus increases modestly reaching a value of 25 GPa at 30% loading. Tensile strength also increased with addition of nanofiller, but at least 10% loading was required to achieve significant increases (FIG. 2). At this level the tensile strength was improved by a factor of 2 to a value of 60 MPa. At this level of loading, Izod impact strength was reduced only 20%, from 33 to 27 J/m (FIG. 3), a much more modest reduction than expected for 10% loading. Even at 30% loading, the impact strength remained comparable, 24 J/m. Finally, the rate of slow crack growth was retarded by addition of chain grafted filler particles. At 10% filler content, the time to failure increased 4.5 times (FIG. 4).

We have examined concentrated polyolefin nanocomposites by electron microscopy, and have found that filler particles do not initiate failure, as expected in noncomposites containing untreated nanofiller particles. Instead nanofiller particles were distributed throughout and were observed even in highly strained craze deformation zones. The particles there act as reinforcements. Similar deformation characteristics were observed in nanocomposites containing silica.

The nanoparticle composites are useful as molding resins to form molded articles. They can replace polyolefins such as polyethylene or polypropylene when decreased crack growth rates are desired.

TABLE I

PHYSICAL PROPERTIES OF FILLER REINFORCED COMPOSITE WITH 2 WT. % SILANE BASED ON FILLER, 10 WT. % SILANE TREATED CLAY AND 90 WT. % MALEATED POLYPROPYLENE IN THE MODIFIED CLAY

| Modified Clay | 0 | 1 | 2 | 5 | 10 | 20 | 30 |
|---|---|---|---|---|---|---|---|
| Isotactic PP | 100 | 99 | 98 | 95 | 90 | 80 | 70 |
| Tensile Modulus GPA | 1.9 | 13 | 14 | 16 | 16 | 17 | 18 |
| Strength MPa | 31 | 32 | 32 | 33 | 43 | 50 | 53 |
| Izod Impact J/M | 33 | 31 | 31 | 30 | 31 | 29 | 28 |

Amounts are parts by weight based upon 100 parts by weight of the modified clay and isotactic polypropylene.

TABLE II

PROPERTIES OF FILLER REINFORCED COMPOSITE WITH 2 WT. % SILANE BASED ON FILLER, 60 WT. % SILANE TREATED CLAY AND 40 WT. % MALEATED POLYPROPYLENE IN THE MODIFIED CLAY

| Modified Clay | 0 | 1 | 2 | 5 | 10 | 20 | 30 |
|---|---|---|---|---|---|---|---|
| Isotactic PP | 100 | 99 | 98 | 95 | 90 | 80 | 70 |
| Tensile Modulus GPa | 1.9 | 16 | 16 | 18 | 19 | 20 | 23 |
| Strength GPa | 31 | 34 | 35 | 35 | 57 | 64 | 68 |
| Izod Impact J/M | 33 | 31 | 29 | 29 | 27 | 25 | 22 |

TABLE III

PROPERTIES OF FILLER REINFORCED COMPOSITE WITH 0 WT. % SILANE, 10 WT. % CLAY AND 90 WT. % MALEATED POLYPROPYLENE IN THE MODIFIED CLAY

| Modified Clay | 0 | 1 | 2 | 5 | 10 | 20 | 30 |
|---|---|---|---|---|---|---|---|
| Isotactic PP | 100 | 99 | 98 | 95 | 90 | 80 | 70 |
| Izod Impact J/M | 33 | 31 | 29 | 28 | 27 | 24 | 22 |

TABLE IV

PROPERTIES OF FILLER REINFORCED COMPOSITE WITH 0 WT. % SILANE, 60 WT. % CLAY AND 40 WT. % MALEATED POLYPROPYLENE IN THE MODIFIED CLAY

| Modified Clay | 0 | 1 | 2 | 5 | 10 | 20 | 30 |
|---|---|---|---|---|---|---|---|
| Isotactic PP | 100 | 99 | 98 | 95 | 90 | 80 | 70 |
| Izod Impact J/M | 33 | 29 | 28 | 27 | 25 | 22 | 21 |

While in accordance with the patent statutes the best mode and preferred embodiment has been set forth, the scope of the invention is not limited thereto, but rather by the scope of the attached claims.

What is claimed is:

1. A semi-crystalline polyolefin composition, comprising;

a) from about 50 to about 99 weight percent of a semi-crystalline polyolefin, b) from about 0.1 to about 50 weight percent of a clay filler having dispersible platelets in stacks, said platelets each having a thickness between about 1 and about 30 nanometers and said stacks being swollen with polymer intercalated in said stacks, c) from about 0.001 to about 3 weight percent of an amino functional silane reacted with said filler, and d) from about 0.1 to about 30 weight percent of a carboxylated or maleated semi-crystalline polyolefin having been reacted with said aminofunctional silane after said silane was reacted with said filler, wherein said weight percents are based upon the weight of said semi-crystalline polyolefin composition.

2. A composition according to claim 1, wherein said aminofunctional silane includes at least one silane of the formula

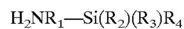

$H_2NR_1$—$Si(R_2)(R_3)R_4$ wherein $R_1$ is an alkyiene group and has a molecular weight from about 20 to about 300, $R_2$ and $R_3$ independently are an alkyl group or aromatic group or a combination thereof having from 1 to 12 carbon atoms, or a group which can be hydrolyzed to from a hydroxyl group, and $R_4$ is a halogen or an alkoxy group or a phenoxy group or a combination thereof having from 1 to 12 carbon atoms.

3. A composition according to claim 2, wherein $R_1$ is an alkylene group of molecular weight from about 20 to about 200.

4. A composition according to claim 1, wherein said semi-crystalline polyolefin is polyethylene or polypropylene.

5. A composition according to claim 3, wherein said semi-crystalline polyolefin is polyethylene or polypropylene.

6. A composition according to claim 5, wherein said semi-crystalline carboxylated or maleated polyolefin is a carboxylated or maleated polyethylene.

7. A composition according to claim 5, wherein said semi-crystalline polyolefin is polypropylene and said semi-crystalline carboxylated or maleated polyolefin is a carboxylated or maleated polypropylene.

8. A process for preparing a filler using a semi-crystalline polyolefin comprising a) reacting a clay fuller having dispersible platelets in stacks, said platelets each having a thickness between 1 and 30 nanometers, with an amino-silane reagent to form an amine functionalized filler with a covalent bond between the amino silane and the filler b) reacting a semi-crystalline polyolefin having pendant carboxyl groups or pendant anhydrides of carboxyl groups with said amine functionalized filler to covalently bond the carboxyl groups or the anhydrides of carboxyl groups to the amine groups of the amine functionalized filler thereby forming a polyolefin functionalized filler thereby swelling said stacks with said polyolefin polymer intercalated in said stacks.

9. A process according to claim 8, wherein said semi-crystalline polyolefin is polyethylene, and including a step of dispersing said polyolefin functionalized filler in polyethylene.

10. A process according to claim 8, wherein said semi-crystalline polyolefin is polypropylene, and including a step of dispersing said polyolefin functionalized filler in polypropylene.

11. A process according to claim 8, including dispersing said polyolefin functionalized filler in a semicrystalline polyolefin.

12. A process according to claim 11, wherein the amount of said amino-silane reagent is from about 0.002 to about 0.05 grams per gram of filler and said semi-crystalline polyolefin having pendant, carboxyl groups or pendant anhydrides of carboxyl groups is present in an amount from about 0.05 to about 9.5 grams per gram of filler.

13. A process according to claim 12, wherein said semi-crystalline polyolefin having pendant carboxyl or anhydride groups has from about 0.01 to about 10 mole percent repeat units with either a pendant carboxyl or anhydride group and has at least 10 weight percent crystallinity.

* * * * *

UNITED STATES PATENT AND TRADEMARK OFFICE
CERTIFICATE OF CORRECTION

PATENT NO. : 5,910,523

DATED : June 8, 1999

INVENTOR(S) : Steven David Hudson

It is certified that error appears in the above-identified patent and that said Letters Patent is hereby corrected as shown below:

Insert on the 3rd line of column 1 the following:

"This invention was made with U.S. government support under sponsor award #EEC91-08700 from the National Science Foundation. The government has certain rights in the invention."

Signed and Sealed this

Sixteenth Day of November, 1999

Attest:

Q. TODD DICKINSON

*Attesting Officer*

*Acting Commissioner of Patents and Trademarks*